United States Patent
Naito

(10) Patent No.: US 9,467,594 B2
(45) Date of Patent: Oct. 11, 2016

(54) COMMUNICATION APPARATUS THAT SPECIFIES NETWORK, CONTROL METHOD THEREFOR AND STORAGE MEDIUM

(71) Applicant: CANON KABUSHIKI KAISHA, Tokyo (JP)

(72) Inventor: Yosui Naito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/667,878

(22) Filed: Mar. 25, 2015

(65) Prior Publication Data
US 2015/0281512 A1    Oct. 1, 2015

(30) Foreign Application Priority Data
Mar. 28, 2014    (JP) .................. 2014-068643

(51) Int. Cl.
| H04M 11/00 | (2006.01) |
| H04N 1/327 | (2006.01) |
| H04M 7/00  | (2006.01) |
| H04M 3/22  | (2006.01) |
| H04L 29/06 | (2006.01) |
| H04M 7/12  | (2006.01) |

(52) U.S. Cl.
CPC .......... *H04N 1/32797* (2013.01); *H04L 65/00* (2013.01); *H04M 3/2272* (2013.01); *H04M 7/006* (2013.01); *H04M 7/0024* (2013.01); *H04M 7/1205* (2013.01); *H04M 7/129* (2013.01); *H04M 2201/52* (2013.01)

(58) Field of Classification Search
None
See application file for complete search history.

(56) References Cited

U.S. PATENT DOCUMENTS

| 6,707,580 | B1* | 3/2004 | Bloomfield | H04L 12/58 358/1.15 |
| 7,593,389 | B2* | 9/2009 | Vance | H04M 1/2535 370/352 |
| 8,737,386 | B2* | 5/2014 | Thompson | H04L 29/06027 370/352 |
| 2002/0186686 | A1 | 12/2002 | Chen | |
| 2004/0001224 | A1* | 1/2004 | Kajiwara | H04L 12/66 358/1.15 |
| 2004/0184110 | A1* | 9/2004 | Maei | H04N 1/00209 358/400 |
| 2005/0117183 | A1* | 6/2005 | Adlakha | H04L 29/06 358/402 |
| 2006/0274731 | A1* | 12/2006 | Ito | H04M 1/2535 370/352 |
| 2008/0117477 | A1* | 5/2008 | Fujise | H04N 1/00214 358/468 |

(Continued)

FOREIGN PATENT DOCUMENTS

JP    2003018292 A    1/2003

*Primary Examiner* — Maria El-Zoobi
(74) *Attorney, Agent, or Firm* — Rossi, Kimms & McDowell LLP

(57) ABSTRACT

A communication apparatus enabling a user to easily specify a network for communication. A communication apparatus, to which a telephone is adapted to be connected, is capable of communicating with a plurality of networks. A dial tone output unit outputs, when off-hook of the telephone is detected, a dial tone to the telephone in accordance with dial tone setting information includes a dial tone, to be output to the telephone, which is based on whether a connection to the networks is available. A detection unit detects, when the dial tone is output to the telephone by the dial tone output unit, input contents. A storage unit stores registration information, used for identifying one network from among the plurality of networks based on the detected contents. An identification unit identifies a network for communication including a communication destination based on the detected contents, in accordance with the registration information.

10 Claims, 12 Drawing Sheets

(56) References Cited

U.S. PATENT DOCUMENTS

| | | | |
|---|---|---|---|
| 2010/0253962 A1* | 10/2010 | Higuchi | H04N 1/00214 358/1.13 |
| 2011/0051716 A1* | 3/2011 | Shintani | H04M 1/2473 370/352 |
| 2015/0172496 A1* | 6/2015 | Ohara | H04N 1/00904 358/1.13 |

* cited by examiner

| NGN | INTRANET | VoIP GW | PSEUDO DIAL TONE (DT) | |
|---|---|---|---|---|
| ON | OFF | OFF | OUTSIDE-LINE DT | ~A |
| OFF | ON | OFF | EXTENSION DT | ~B |
| OFF | OFF | ON | OUTSIDE-LINE DT | ~C |
| ON | ON | OFF | EXTENSION DT | ~D |
| ON | OFF | ON | EXTENSION DT | ~E |
| OFF | ON | ON | EXTENSION DT | ~F |
| ON | ON | ON | EXTENSION DT | ~G |

| OUTSIDE-LINE SWITCHING SETTING REGISTRATION | | |
|---|---|---|
| SWITCHING METHOD | HOOKING/PREFIX | |
| PREFIX | | |
| | NGN | 0 |
| | VoIP GW | 25 |
| HOOKING | | |
| | NGN | 1 TIME |
| | VoIP GW | 2 TIMES |

COMMUNICATION APPARATUS THAT SPECIFIES NETWORK, CONTROL METHOD THEREFOR AND STORAGE MEDIUM

BACKGROUND OF THE INVENTION

1. Field of the Invention

The present invention relates to a communication apparatus that specifies network, a control method therefor and a storage medium.

2. Description of the Related Art

There becomes widespread a VoIP (Voice over Internet Protocol) technique of communicating voice on an IP network, which is a technique of converting an analog voice signal to digital data by PCM (Pulse Code Modulation) in real time (PCM data conversion) and converting the digital data (PCM data) to a voice IP packet to perform voice communication on an IP network.

As a call connection protocol on the IP network, a SIP (Session Initiation Protocol) is used. Further, there becomes widespread a VoIP gateway (hereinafter referred to as "the VoIP GW") for communicating voice between an IP telephone network and an analog telephone network.

There is used a technique, referred to as "the pseudo voice communication", of converting an analog signal of a G3 FAX apparatus in conformity with ITU-T Recommendation T.30 to a voice IP packet to communicate with a G3 FAX apparatus connected to an analog telephone network via a VoIP GW, with the IP packet as voice.

Further, there also starts becoming widespread an IP FAX apparatus in conformity with ITU-T Recommendation T.38, which converts a signal of a G3 FAX apparatus compatible with T.30 to an IP message on an IP network and transmits the IP message in real time.

Furthermore, some VoIP GWs have a mutual conversion function of performing protocol conversion between T.38 and T.30 in real time.

Via the VoIP GWs having the mutual conversion function, it is possible to perform communication between the IP FAX apparatus compatible with T.38 and the G3 FAX apparatus compatible with T.30.

FAX communication by T.38 has an advantage of, in comparison with the pseudo voice communication requiring a voice band, enabling the band width to be decreased, enabling higher-speed communication to be performed because there is no restriction by the modulation speed of a modem.

On the other hand, the pseudo voice communication has an advantage of realizing even communication with a G3 FAX apparatus connected to a conventional analog telephone network connected to an IP network at a gateway, as described above.

Many of the conventional G3 FAX apparatus each are adapted such that a telephone can be connected thereto, whereby connecting the telephone to the G3 FAX apparatus realizes manually dialing or makes the telephone conversation, etc.

On the other hand, there has been devised a communication apparatus which can be connected to a telephone by using an SLIC (Subscriber Line Interface Circuit) in order to realize a telephone conversation via an IP network (see Japanese Laid-Open Patent Publication (Kokai) No. 2003-18292, for example).

The SLIC performs an analog-digital conversion process by a voice codec such as G.711. Therefore, use of the SLIC makes it possible to perform a telephone conversation using an IP network by converting a voice signal input from a telephone to PCM data and transmitting the PCM data to the IP network or by returning a voice packet received from the IP network to analog voice before outputting the analog voice to the telephone.

Furthermore, since the SLIC is capable of generating a telephone call signal or various kinds of tone signals and detecting DTMF (Dual Tone Multi-Frequency) generated by a telephone, it is possible to perform telephone line emulation.

Thus, since use of the SLIC in the IP FAX apparatus makes it possible to connect a telephone to an IP network without via a telephone line, even use of the IP FAX apparatus realizes manually dialing or makes a telephone conversation as in the case of use of a conventional G3 FAX apparatus.

Further, some of recent IP FAX apparatuses each is capable of connecting to a plurality of kinds of networks to perform simultaneous communication, which realizes not only communication with an internal IP network (hereinafter referred to as the "intranet"), but also communication with an analog telephone network via a VoIP GW and communication with an NGN (Next Generation Network).

When performing IP FAX communication using such an IP FAX apparatus, it is necessary to appropriately specify a transmission destination of an INVITE signal as a connection request signal of the SIP, according to a network including the communication destination.

Specifically, when the network including the communication destination is an intranet, call connection control is performed by a SIP server connected to the intranet; accordingly it is necessary to specify the address of the SIP server as the transmission destination of the INVITE signal.

When the network including the communication destination is an NGN, the IP FAX apparatus and the NGN are connected via a Home GW (hereinafter referred to as the HGW) or an Office GW (hereinafter referred to as the OGW); accordingly, it is necessary to specify the address of the HGW or the OGW to which the IP FAX apparatus itself is connected as the transmission destination of the INVITE signal.

Further, if the communication destination is connected, as a terminal, to an analog telephone network connected to a VoIP GW, it is necessary to specify the address of the VoIP GW as the transmission destination of the INVITE signal.

As described above, in a case where the IP FAX apparatus is simultaneously connected to a plurality of IP networks, it is necessary to not only input a telephone number but also specify an IP network including the communication destination, when making a call.

Therefore, the ordinary IP FAX communication starts communication after specifying the IP network including the communication destination, from the user interface of an IP FAX apparatus simultaneously when a user inputs a telephone number.

When using an IP FAX apparatus compatible with a telephone function, the user manually dials on a telephone connected to the IP FAX apparatus. Thus, if the telephone is placed away from the IP FAX apparatus, it is difficult to specify the IP network including the communication destination, from the user interface of the IP FAX apparatus.

Methods for switching from an extension to an outside line on a telephone connected to an analog telephone network, include a method using a dial prefix and a method using hooking.

When the telephone is connected to the analog telephone network, there occurs a predetermined dial tone. Here, a dial tone for the extension and a dial tone for the outside line are different from each other, which causes the user to determine which of the extension and the outside line the telephone is connected to.

On the other hand, when the telephone is connected to the IP FAX apparatus, there occurs no dial tone, which disables the user to determine which IP network the IP FAX apparatus is connected to, and whether or not the telephone can be connected to a plurality of IP networks.

Therefore, the user cannot determine whether or not it is necessary to perform an IP network specifying process before dialing.

SUMMARY OF THE INVENTION

The present invention provides a communication apparatus enabling a user to easily specify a network for communication, a control method therefor and a storage medium.

To attain the above the object, according to a first aspect of the invention, there is provided a communication apparatus, to which a telephone is connected, capable of communicating with a plurality of networks, comprising a dial tone output unit configured to output, when off-hook of the telephone is detected, a dial tone to the telephone in accordance with dial tone setting information includes a dial tone, to be output to the telephone the dial tone being set based on whether or not a connection to each of the plurality of networks is available a detection unit configured to detect, when the dial tone is output to the telephone by the dial tone output unit, input contents input by the telephone a storage unit configured to store registration information used for identifying a network, the registration information being used for identifying one network from among the plurality of networks based on the detected contents; and an identification unit configured to identify a network for communication which includes a communication destination based on the detected contents, in accordance with the registration information.

To attain the above the object, according to a second aspect of the present invention, there is provided a communication apparatus, provided with a telephone, capable of communicating with a plurality of networks, comprising a dial tone output unit configured to output, when off-hook of the telephone is detected, a dial tone to the telephone in accordance with dial tone setting information includes a dial tone to be output to the telephone the dial tone being set based on whether or not a connection to each of the plurality of networks is available; a detection unit configured to detect, when the dial tone is output to the telephone by the dial tone output unit, input contents input by the telephone; a storage unit configured to store registration information used for identifying a network, the registration information being used for identifying one network from among the plurality of networks based on the detected contents; and an identification unit configured to identify a network for communication which includes a communication destination based on the detected contents, in accordance with the registration information.

According to the present invention, when off-hook of a telephone is detected, a dial tone is output to the telephone in accordance with dial tone setting information; and, when the dial tone is output to the telephone, input contents input on the telephone are detected, and a network for communication which includes a communication destination is identified in accordance with registration information which is based on the detected input contents. Therefore, the user can easily specify a network for a communication.

Further features of the present invention will become apparent from the following description of exemplary embodiments with reference to the attached drawings.

BRIEF DESCRIPTION OF THE DRAWINGS

FIG. 3A is a view showing a pseudo dial tone table which defines the kinds of pseudo dial tones stored in a ROM in FIG. 2.

FIG. 3B is a view showing an outside line switching setting registration table stored in a RAM in FIG. 2.

DESCRIPTION OF THE EMBODIMENTS

The present invention will now be described in detail below with reference to the accompanying drawings showing embodiments thereof.

Figure 1:
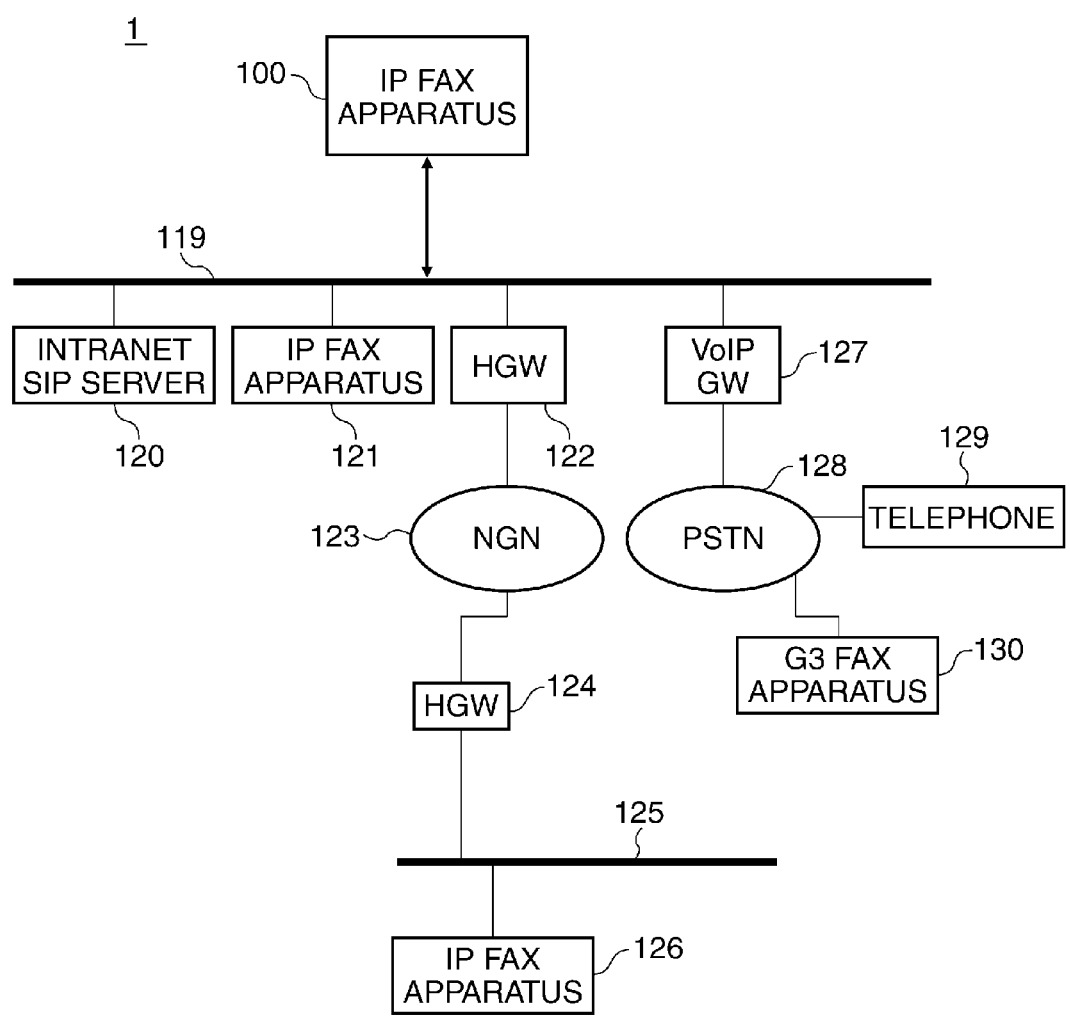
FIG. 1 is a view schematically showing an arrangement of a communication system 1 which includes an IP FAX apparatus as a communication apparatus according to an embodiment of the present invention.

FIG. 1 is a view schematically showing an arrangement of a communication system 1 which includes an IP FAX apparatus 100 as a communication apparatus according to the embodiment of the present invention.

In FIG. 1, an IP FAX apparatus 100 is connected to an intranet 119, and can perform IP FAX communication with each of an IP FAX apparatus 121, an IP FAX apparatus 126, and a G3 FAX 130, as described later.

The IP FAX apparatus 121 is connected directly to the intranet 119. When performing the IP FAX communication with the IP FAX apparatus 121, the IP FAX apparatus 100 transmits an INVITE signal to an intranet SIP (Session Initiation Protocol) server 120 connected to the intranet 119. In this regard, the intranet SIP server 120 performs a call connection process in order for the IP FAX apparatus 100 to communicate with the IP FAX apparatus 121 connected to the intranet 119.

The IP FAX apparatus 126 is connected to a LAN (Local Area Network) 125 (intranet). The IP FAX apparatus 126 is communicably connected to the IP FAX apparatus 100 via an HGW (Home gateway) 122 connected to the intranet 119, an NGN (Next Generation Network) 123, and an HGW 124 connected to the LAN 125.

When performing the IP FAX communication with the IP FAX apparatus 126, the IP FAX apparatus 100 transmits an INVITE signal to the HGW 122 connected to the intranet 119.

The G3 FAX 130 is compatible only with T.30 FAX communication, and communicably connected to the IP FAX apparatus 100 via a VoIP GW (Voice over Internet Protocol gateway) 127 connected to the intranet 119, and a PSTN (Public Switched Telephone Network) 128. A telephone 129 is connected to the PSTN 128.

When performing the IP FAX communication with the G3 FAX 130, the IP FAX apparatus 100 transmits an INVITE signal to the VoIP GW 127 connected to the intranet 119.

As described above, the IP FAX apparatus 100 is capable of communicating with a plurality of networks (the intranets, the NGN, and the PSTN).

Figure 2:
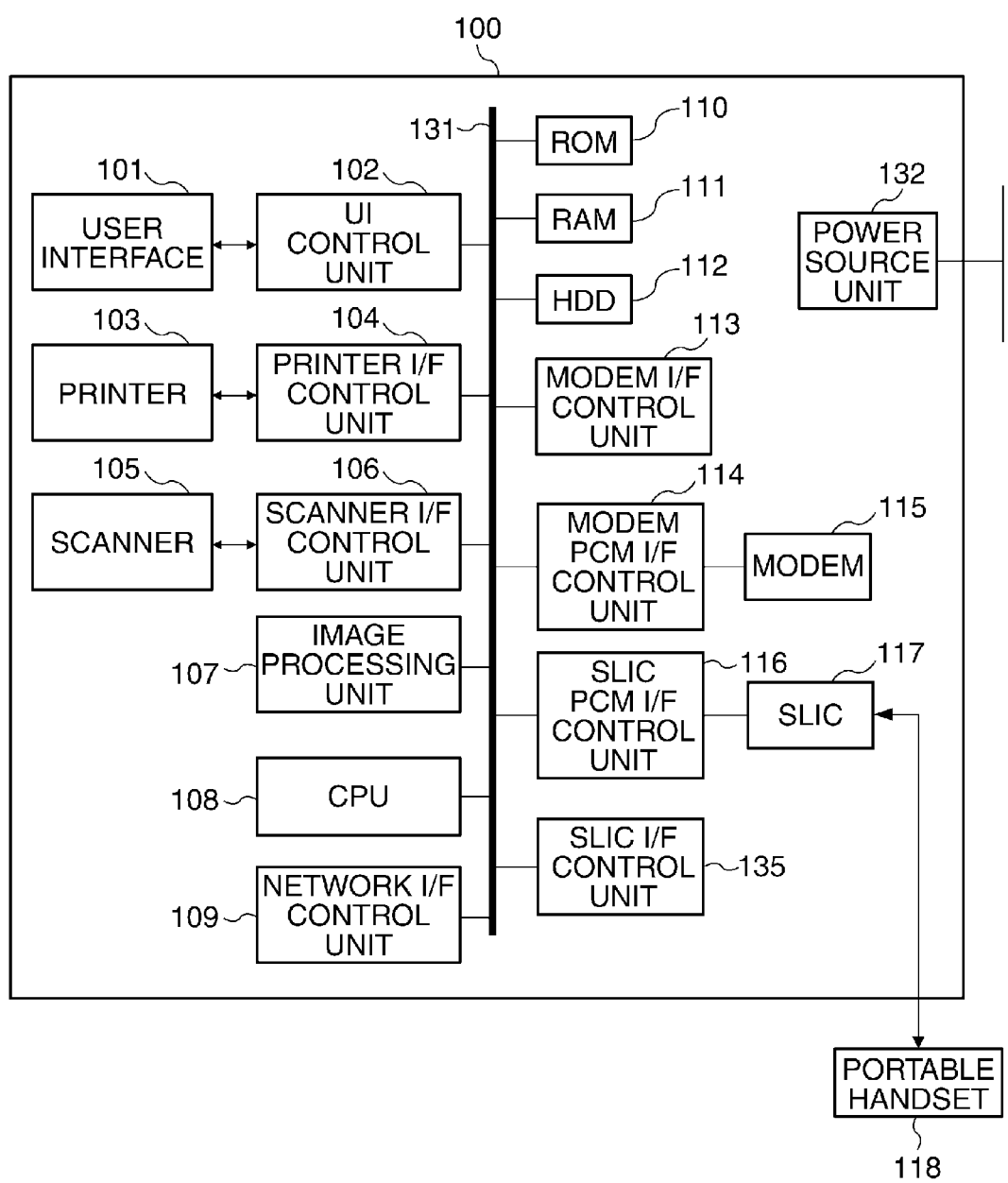
FIG. 2 is a view schematically showing an arrangement of the IP FAX apparatus in FIG. 1.

FIG. 2 is a view schematically showing an arrangement of the IP FAX apparatus 100 in FIG. 1.

In FIG. 2, the IP FAX apparatus 100 includes a UI control unit 102, a printer interface control unit 104, a scanner interface control unit 106, an image processing unit 107, a CPU 108, a network interface control unit 109, a ROM 110, a RAM 111, a HDD 112, a modem interface control unit 113, a modem PCM (Pulse Code Modulation) interface control unit 114, an SLIC (Subscriber Line Interface Circuit) PCM interface control unit 116, and an SLIC interface control unit 135, and each of them is connected to a bus 131.

Furthermore, the IP FAX apparatus 100 includes a user interface 101, a printer 103, a scanner 105, a modem 115, an SLIC 117, a power source unit 132, and a portable handset 118.

The CPU 108 controls whole of the IP FAX apparatus 100 by reading various kinds of software programs for the IP FAX apparatus 100 from the ROM 110 and the HDD 112, developing the read various kinds of software programs in the RAM 111, and executing them.

The ROM 110 stores a boot program, fixed parameters, etc. The RAM 111 stores various kinds of data, such as work data to be used by the CPU 108 at the time of controlling the IP FAX apparatus 100, image data and print data, etc., and various kinds of programs.

The HDD 112 stores various kinds of data such as image data, print data, and destination registration information, etc. It should be noted that the RAM 111 and the HDD 112 are also used as work areas when the CPU 108 performs image processing, encoding/decoding, or resolution conversion of image data.

The image processing unit 107 is hardware for performing various kinds of image processing, resolution conversion, encoding, decoding, etc. The UI control unit 102 controls the user interface 101 to perform display of various kinds of information and acceptance of an instruction input by the user.

The printer interface control unit 104 controls the printer 103. The scanner interface control unit 106 controls the scanner 105. The network interface control unit 109 controls transmission and reception of data to and from the intranet 119 so that analysis or generation of an IP packet transmitted or received by a protocol such as TCP, UDP, and RTP, is performed. Data transmitted or received as IP packet is stored into the RAM 111 or the HDD 112 once, and subsequently, the data is interpreted and processed by the CPU 108 in accordance with the protocol. The power source unit 132 is connected to a commercial power source to provide power to each unit of the IP FAX apparatus 100.

The modem 115 performs modulation and demodulation between digital data and an analog voice signal, and, in the present embodiment, it internally includes a voice codec (a voice encoding/decoding circuit). Therefore, the modem 115 is configured to convert an analog voice signal to PCM data, which is a digital signal within a voice band in a G.711 format etc., and input/output the PCM data.

The modem 115 is connected to the modem interface control unit 113 in a serial system such as UART and SPI systems. When the IP FAX apparatus 100 performs transmission to an external communication destination, the modem 115 receives image data encoded and transmitted by the CPU 108 via the modem interface control unit 113, and modulates the received image data to generate a voice signal.

The generated voice signal is converted to PCM data by the voice codec internally included in the modem 115 and transmitted to the network interface control unit 109 via the modem PCM interface control unit 114.

It should be noted that, in addition to image data, the modem 115 also converts voice, a tone, DTMF (Dual Tone Multi-Frequency), etc. to PCM data and transmits the PCM data to the network interface control unit 109 via the modem PCM interface control unit 114, according to a control command transmitted from the CPU 108 to the modem 115 via the modem interface control unit 113.

When the IP FAX apparatus 100 performs reception of communication from the external communication destination, the network interface control unit 109 analyzes a voice packet transmitted from the intranet 119 and transmits the analyzed voice packet, as PCM data, to the modem PCM interface control unit 114.

Then, the modem 115 receives the PCM data, converts the received PCM data to a voice signal by the internally included voice codec, and transmits, to the CPU 108 via the modem interface control unit 113, data or image data obtained by demodulating a tone signal, a procedure signal, an image signal, etc. included in the voice signal. The data obtained at this time is stored into the RAM 111, and is used for FAX communication control or printing by the CPU 108.

The SLIC 117 is integrately provided, in a single chip, with an analog-digital conversion circuit, a digital-analog conversion circuit, a DSP, and a voice codec.

When the IP FAX apparatus 100 performs transmission of input voice to the external communication destination, the SLIC 117 performs analog-digital conversion of the voice input from a microphone of the portable handset 118, performs signal processing by the DSP, and performs conversion to G.711-format PCM data or other encoded data by the voice codec. After that, the data obtained by the conversion is transmitted to the network interface control unit 109 via the SLIC PCM interface control unit 116.

Further, when the IP FAX apparatus 100 performs reception and output of voice transmitted from the external communication destination, after the network interface control unit 109 receives the G.711-format PCM data or other encoded data from the intranet 119, the SLIC 117 receives the data received by the network interface control unit 109, via the SLIC PCM interface control section 116.

After the SLIC 117 has received the data, the data is decoded by the voice codec, subjected to signal processing by the DSP, subjected to digital-analog conversion, and transmitted to the portable handset 118, whereby voice is output from a speaker of the portable handset 118.

Furthermore, the SLIC 117 includes externally attached circuits required for off-hook detection, application of a direct current, and transmission of a call signal, and controls the portable handset 118 for the PSTN to perform the off-hook detection, the application of the direct current, the transmission of the call signal, etc., by using the externally attached circuits.

Further, the SLIC 117 is also configured to perform tone detection or pulse detection to detect a destination specification signal for making a call, and to generate various kinds of tone signals.

By the SLIC 117 as described above, it is possible to connect an analog telephone to the intranet 119 without via the PSTN. It should be noted that the SLIC 117 and the SLIC interface control unit 135 are connected with each other in a serial system such as UART system, SPI system, etc.

It should be noted that detection of hooking is performed by the SLIC 117 monitoring the voltage or current of an analog port of the SLIC 117, to which the portable handset 118 is connected. Hooking means an operation of instantaneously turning on/off the hook of the portable handset 118. When hooking is performed, the voltage of the analog port increases and the current of the analog port decreases, instantaneously; and thereafter, the voltage and the current of the analog port return to the original values.

Utilizing this, the SLIC 117 detects hooking by detecting an increase in the voltage or a decrease in the current of the analog port within a specified time.

Detection of a dial number is performed by the SLIC 117 monitoring a signal input from the analog port, to which the portable handset 118 is connected. Specifically, the SLIC 117 detects an input dial number by detecting DTMF indicating that dialing has been performed.

As described above, the IP FAX apparatus 100 in the present embodiment can detect the off-hook and the dial number as contents of an input on the telephone by the SLIC 117.

The portable handset 118 corresponding to the telephone is used for a telephone conversation by the user, and is connected to the SLIC 117 via an interface for the PSTN. The portable handset 118 internally includes a microphone and a speaker. The user's voice is input from the microphone, and voice data transmitted from the communication destination is output from the speaker. The portable handset 118 may be a telephone connectable to the IP FAX apparatus 100 or may be a telephone disposed on the IP FAX apparatus 100.

FIG. 3A is a view showing a pseudo dial tone table 200 which defines the kinds of pseudo dial tones stored in the ROM 110 in FIG. 2, and FIG. 3B is a view showing an outside line switching setting registration table 300 stored in the RAM 111 in FIG. 2.

In FIG. 3A, "NGN", "intranet", "VoIP GW" and "pseudo dial tone" are shown in the pseudo dial tone table 200 as items.

In the items of "NGN", "intranet" and "VoIP GW", "ON" or "OFF" is shown, wherein "ON" indicates that connection is available, and "OFF" indicates that connection is unavailable. In FIG. 3A, seven cases A to G in which connection to each of "NGN", "intranet" and "VoIP GW" is available or unavailable.

The "pseudo dial tone" indicates the kind of a dial tone to be output to the portable handset 118 when the portable handset 118 is hooked up, and two kinds, "for outside line" and "for extension", are shown. It should be noted that, in the present embodiment, the pseudo dial tone for outside line (hereinafter referred to as the "outside-line DT") is a continuous dial tone, and the pseudo dial tone for extension (hereinafter referred to as the "extension DT") is an intermittent dial tone.

For example, in the case A, only connection to "NGN" is available, and connection of IP networks other than "NGN" is unavailable; therefore, the outside-line DT is output to the portable handset 118 to inform that it is unnecessary to specify the IP network including the communication destination.

In the case D, connection to "NGN" and connection to "intranet" are available. When it is possible to make a call to both of an outside line and an extension, an extension DT is output to the portable handset 118 first, similarly to the case of an analog telephone.

Furthermore, in the case E, connection to "NGN" and connection to "VoIP GW" are available. When it is possible to make a call to two outside lines, it is necessary to uniquely decide the IP network including the communication destination.

In this case, the user uniquely decides the IP network including the communication destination, by a dial prefix (a prefix) input operation or a hooking operation. In order to prompt the user to perform this operation, the extension DT is output to the portable handset 118.

As described above, in the present embodiment, the kind of a dial tone to be output to the portable handset 118 is shown in the pseudo dial tone table 200 (corresponding to a dial tone setting information) on the basis of whether or not connection to each of a plurality of networks is available.

Specifically, when a network for performing communication is uniquely determined as in the cases A and C, and the network is not an intranet, a predetermined dial tone for outside line is set in the pseudo dial tone table 200.

On the other hand, when the network for performing communication is not uniquely determined as in the cases D to G, or when the network for performing communication is an intranet as in the case B, a dial tone for extension different from the dial tone for outside line is set in the pseudo dial tone table 200.

Next, the outside line switching setting registration table 300 in FIG. 3B will be described. The outside line switching setting registration table 300 registers an outside line switching method which is based on the value of a prefix and an outside line switching method which is based on the number of times of hooking.

In the outside line switching method which is based on the value of a prefix, for example, an outside line is switched to the NGN when the prefix is "0", and the outside line is switched to the VoIP GW when the prefix is 25. If the input value does not match the registered contents, the value is regarded as a part of a dial number, and outside line switching is not performed.

In the outside line switching method which is based on the number of times of hooking, for example, an outside line is switched to the NGN when the number of times of hooking (the number of times of off-hook) is "1", and the outside line is switched to the VoIP GW when the number of times of hooking is "2".

It should be noted that, in the present embodiment, if only connection to any one of the NGN and the VoIP GW is available, only "1" can be registered as the number of times of hooking. Further, if bookings of which the number of times exceeds the number of times of hooking registered in the outside line switching setting registration table 300 are detected, the outside line is switched to an IP network of which the number of times of hooking is the largest among registered IP networks.

As described above, in the present embodiment, the contents shown in the outside line switching setting registration table 300 corresponds to registration information. In the outside line switching setting registration table 300, different dial numbers are registered as prefixes with associated for each network, and different numbers of times of hooking are registered with associated for each network.

A description will be given of transmission destination decision processes A to G for deciding a transmission destination of an INVITE signal at the time of performing manual transmission by the portable handset 118, which correspond to the cases A to G shown in FIG. 3A, respectively. It should be noted that the transmission destination of the INVITE signal in the case of communicating with an extension is the intranet SIP server 120 as shown in FIG. 1. The transmission destination of the INVITE signal in the case of communicating with the NGN 123 is the HGW 122. The transmission destination of the INVITE signal in the case of communicating with the PSTN 128 is the VoIP GW 127.

Figure 4A:
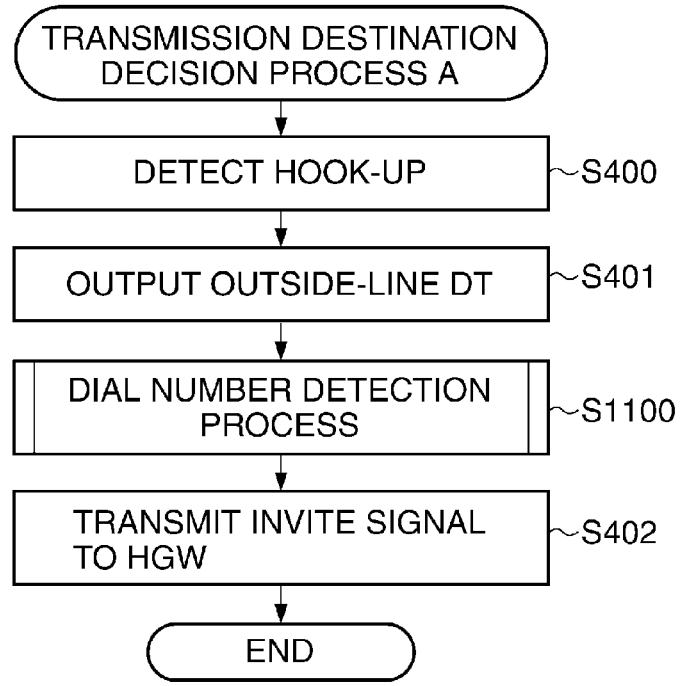
FIG. 4A is a flowchart showing the procedure of a transmission destination decision process A executed by a CPU in FIG. 2.
Figure 4B:
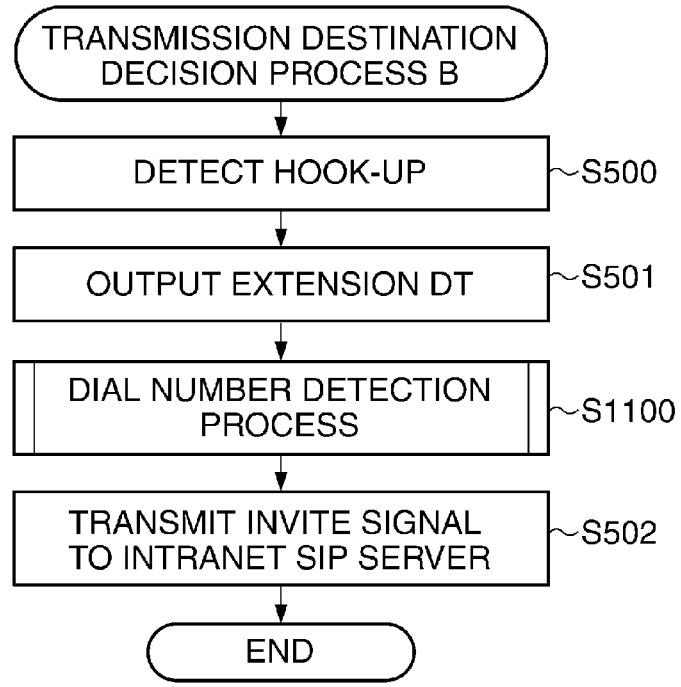
FIG. 4B is a flowchart showing the procedure of a transmission destination decision process B executed by the CPU in FIG. 2.
Figure 4C:
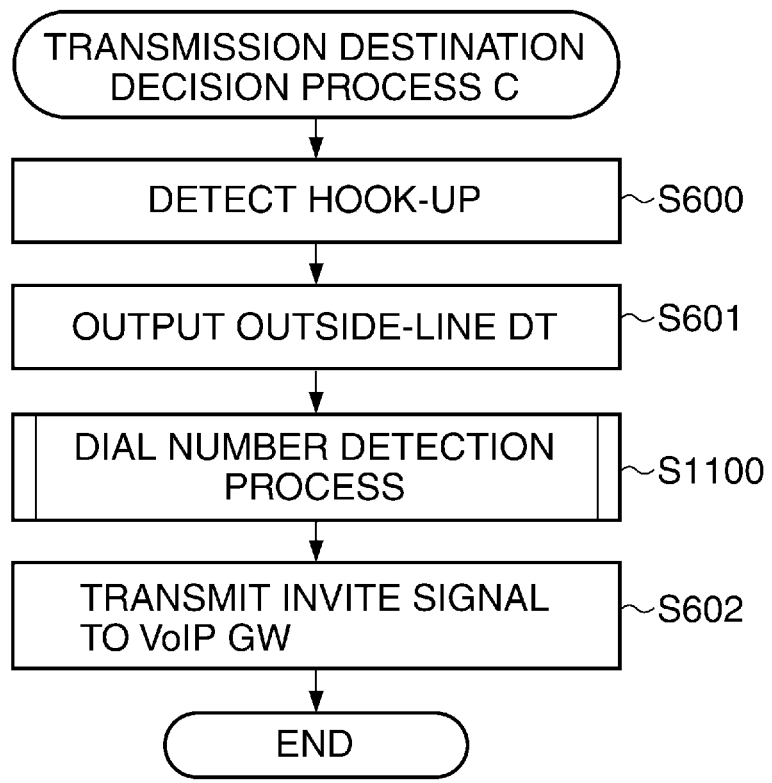
FIG. 4C is a flowchart showing the procedure of a transmission destination decision process C executed by the CPU in FIG. 2.

FIGS. 4A to 4C are flowcharts respectively showing the procedures of the transmission destination decision processes A to C executed by the CPU 108 in FIG. 2.

First, the transmission destination decision process A corresponding to the case A will be described. In FIG. 4A, the SLIC 117 detects that the portable handset 118 has been hooked up (step S400). Next, the SLIC 117 outputs an outside-line DT to the portable handset 118 (step S401).

Then, the SLIC 117 performs the dial number detection process of FIG. 9, described later, for detecting a dial number input on the portable handset 118 (step S1100). The detected dial number is stored into the RAM 111. Next, the SLIC 117 transmits, to the HGW 122, an INVITE signal including the dial number stored in the RAM 111 (step S402), followed by the process terminating.

Next, the transmission destination decision process B corresponding to the case B will be described. In FIG. 4B, the SLIC 117 detects that the portable handset 118 has been hooked up (step S500). Next, the SLIC 117 outputs an extension DT to the portable handset 118 (step S501).

The SLIC 117 performs the dial number detection process of FIG. 9, described later, (step S1100), and subsequently transmits, to the intranet SIP server 120, an INVITE signal including the dial number stored in the RAM 111 (step S502), followed by the process terminating.

Next, the transmission destination decision process C corresponding to the case C will be described. In FIG. 4C, the SLIC 117 detects that the portable handset 118 has been hooked up (step S600), and subsequently outputs an outside-line DT to the portable handset 118 (step S601).

The SLIC 117 performs the dial number detection process of FIG. 9, described later, (step S1100), and subsequently the SLIC 117 transmits, to the VoIP GW 127, an INVITE signal including the dial number stored in the RAM 111 (step S602), followed by the process terminating.

Figure 5:
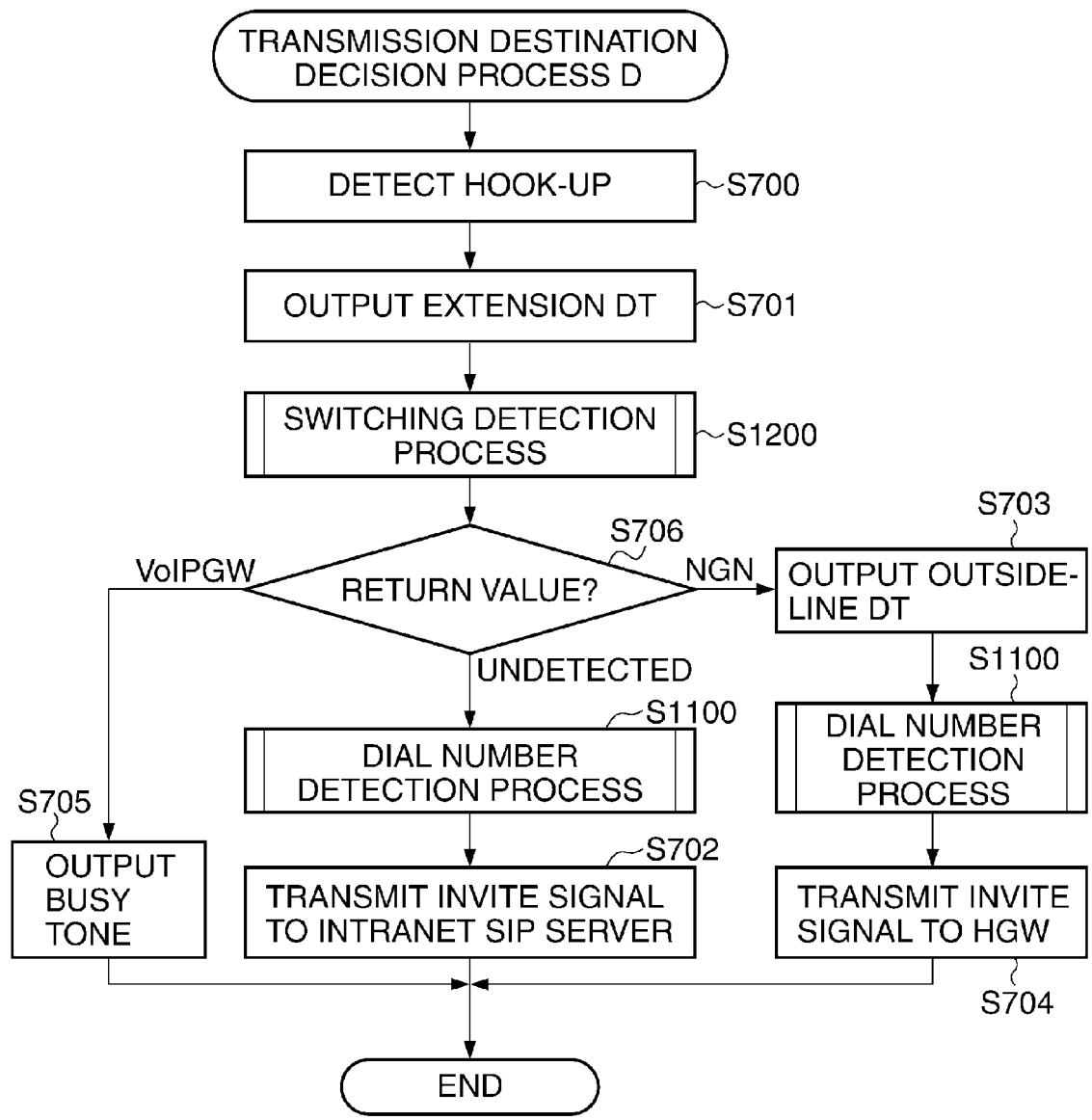
FIG. 5 is a flowchart showing the procedure of a transmission destination decision process D executed by the CPU in FIG. 2.

FIG. 5 is a flowchart showing the procedure of the transmission destination decision process D executed by the CPU 108 in FIG. 2.

The transmission destination decision process D corresponding to the case D will be described. In FIG. 5, the SLIC 117 detects that the portable handset 118 has been hooked up (step S700), and subsequently outputs an extension DT to the portable handset 118 (step S701).

Then, the SLIC 117 performs a switching detection process of FIGS. 10 and 11, described later, for detecting outside line switching (step S1200), followed by the process proceeding to step S706. A return value of the switching detection process is "NGN", "VoIP GW", "intranet SIP server" or "undetected". The return value "undetected" means that outside line switching has not been detected, thereby showing that communication is to be performed with an extension. Therefore, the transmission destination of an INVITE signal is the intranet SIP server 120.

When the return value is "VoIP GW" in step S706 ("VoIP GW" to step S706), connection to "VoIP GW" is unavailable in the case D; accordingly, the SLIC 117 outputs a busy tone to the portable handset 118, followed by the process terminating.

When the return value is "undetected" in step S706 ("undetected" to step S706), the SLIC 117 performs the dial number detection process of FIG. 9, described later, (step S1100). Then, the SLIC 117 transmits, to the intranet SIP server 120, an INVITE signal including the dial number stored in the RAM 111 (step S702), followed by the process terminating.

When the return value is "NGN" in step S706 ("NGN" to step S706), the SLIC 117 outputs an outside-line DT to the portable handset 118 (step S703) and performs the dial number detection process of FIG. 9, described later (step S1100), and subsequently transmits, to the HGW 122, an INVITE signal including the dial number stored in the RAM 111 (step S702), followed by the process terminating.

Figure 6:
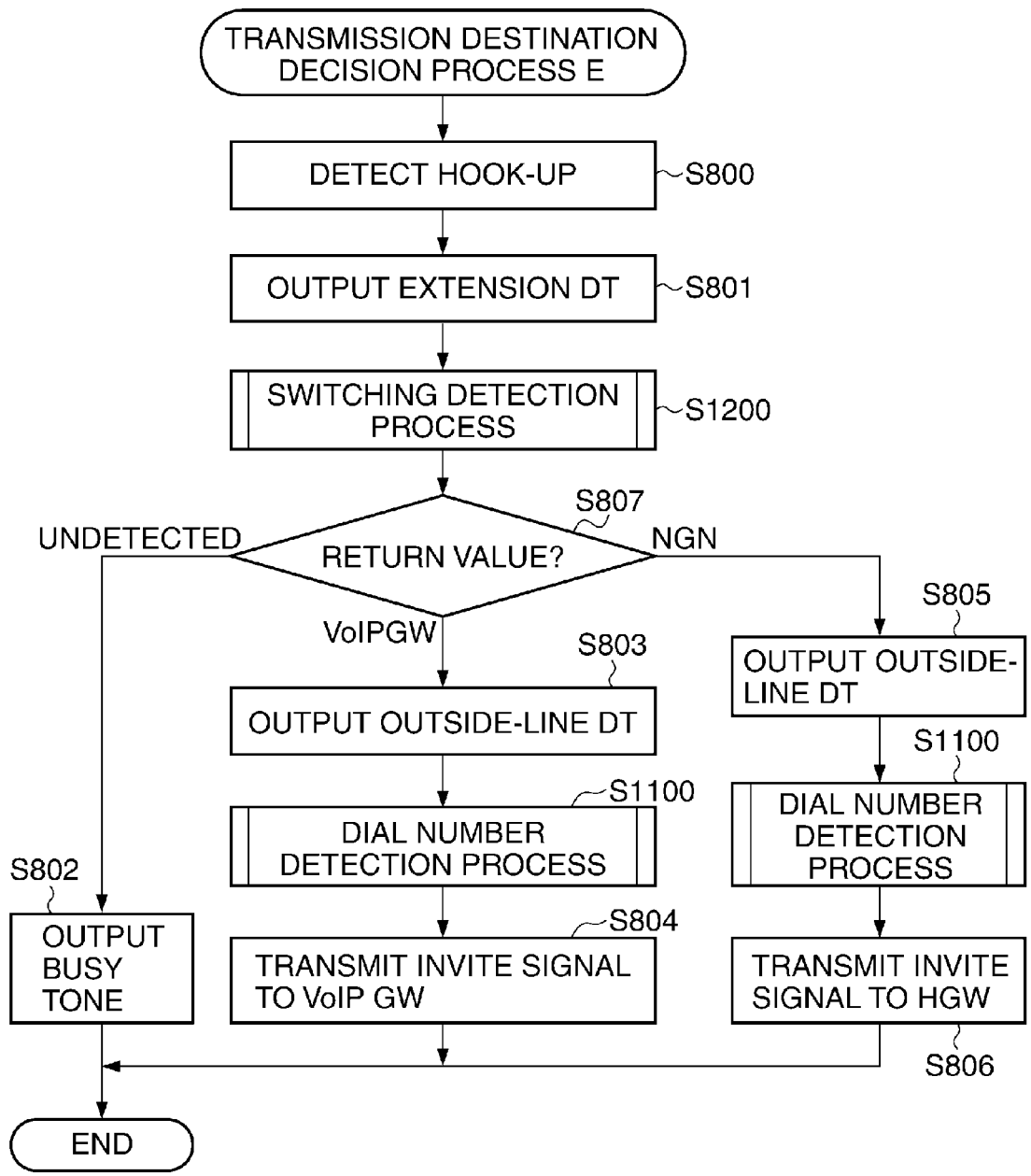
FIG. 6 is a flowchart showing the procedure of a transmission destination decision process E executed by the CPU in FIG. 2.

FIG. 6 is a flowchart showing the procedure of the transmission destination decision process E executed by the CPU 108 in FIG. 2.

A description will be given of the transmission destination decision process E corresponding to the case E. In FIG. 6, the SLIC 117 detects that the portable handset 118 has been hooked up (step S800), and subsequently outputs an extension DT to the portable handset 118 (step S801).

Then, the SLIC 117 performs the switching of FIGS. 10 and 11, described later, detection process for detecting outside line switching (step S1200), followed by the process proceeding to step S807.

When the return value is "undetected" in step S807 ("undetected" to step S807), the connection to "intranet" is unavailable in the case E; accordingly, the SLIC 117 outputs a busy tone to the portable handset 118 (step S802), followed by the process terminating.

When the return value is "VoIP GW" in step S807 ("VoIP GW" to step S807), the SLIC 117 outputs an outside-line DT to the portable handset 118 (step S803) and performs the dial number detection process of FIG. 9, described later, (step S1100). Then, the SLIC 117 transmits, to the VoIP GW 127, an INVITE signal including the dial number stored in the RAM 111 (step S804), followed by the process terminating.

When the return value is "NGN" in step S807 ("NGN" to step S807), the SLIC 117 outputs an outside-line DT to the portable handset 118 (step S805) and performs the dial number detection process of FIG. 9, described later, (step S1100). Then, the SLIC 117 transmits, to the HGW 122, an INVITE signal including the dial number stored in the RAM 111 (step S806), followed by the process terminating.

Figure 7:
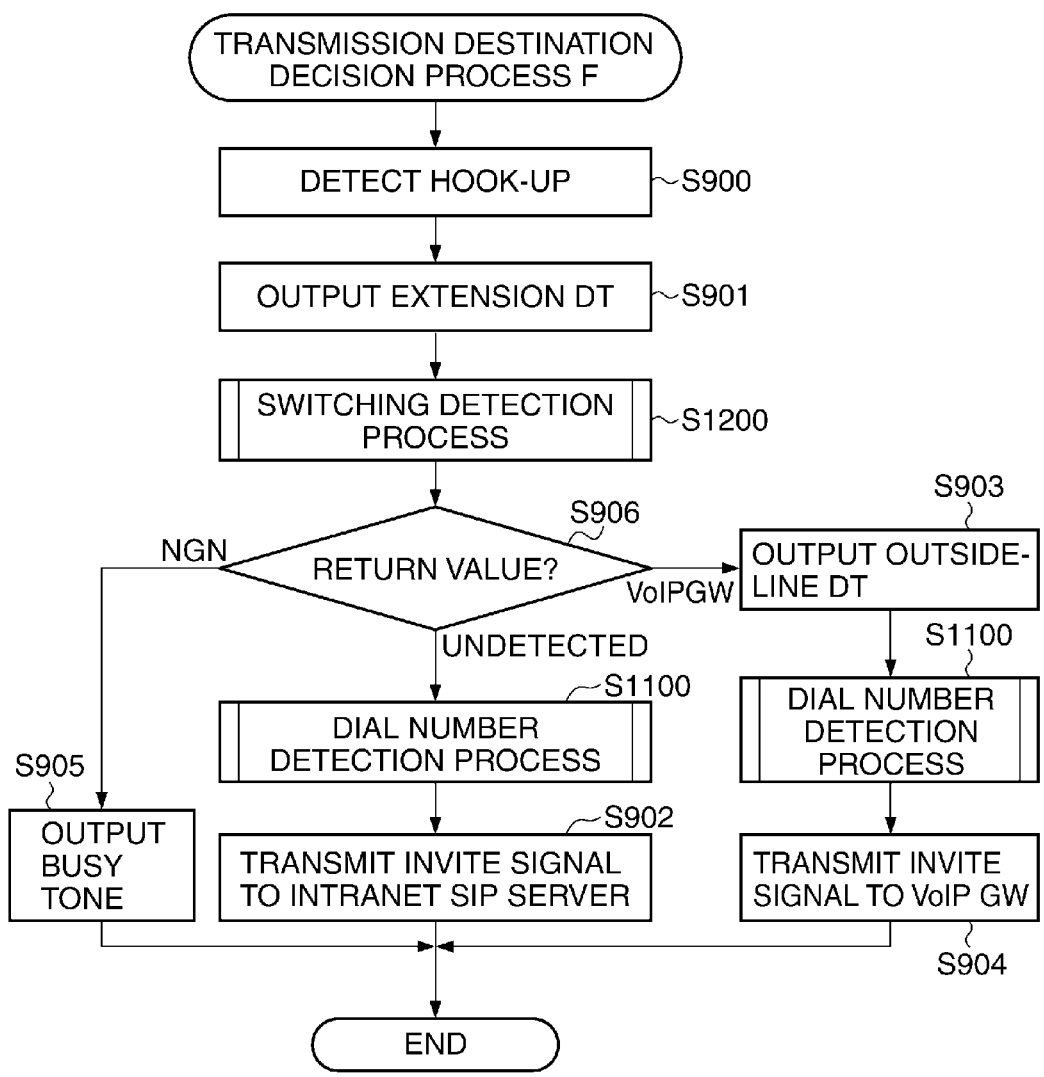
FIG. 7 is a flowchart showing the procedure of a transmission destination decision process F executed by the CPU in FIG. 2.

FIG. 7 is a flowchart showing the procedure of the transmission destination decision process F executed by the CPU 108 in FIG. 2.

A description will be given of the transmission destination decision process F corresponding to the case F. In FIG. 7, the SLIC 117 detects that the portable handset 118 has been hooked up (step S900), and subsequently outputs an extension DT to the portable handset 118 (step S901).

Then, the SLIC 117 performs the switching of FIGS. 10 and 11, described later, detection process for detecting outside line switching (step S1200), followed by the process proceeding to step S906.

When the return value is "NGN" in step S906 ("NGN" to step S906), the connection to "NGN" is unavailable in the case F; accordingly, the SLIC 117 outputs a busy tone to the portable handset 118 (step S905), followed by the process terminating.

When the return value is "undetected" in step S906 ("undetected" to step S906), the SLIC 117 performs the dial number detection process of FIG. 9, described later (step S1100), and then transmits, to the intranet SIP server 120, an INVITE signal including the dial number stored in the RAM 111 (step S902), followed by the process terminating.

When the return value is "VoIP GW" in step S906 ("VoIP GW" to step S906), the SLIC 117 outputs an outside-line DT to the portable handset 118 (step S903) and performs the dial number detection process of FIG. 9, described later (step S1100), and then transmits, to the VoIP GW 127, an INVITE signal including the dial number stored in the RAM 111 (step S904), followed by the process terminating.

Figure 8:
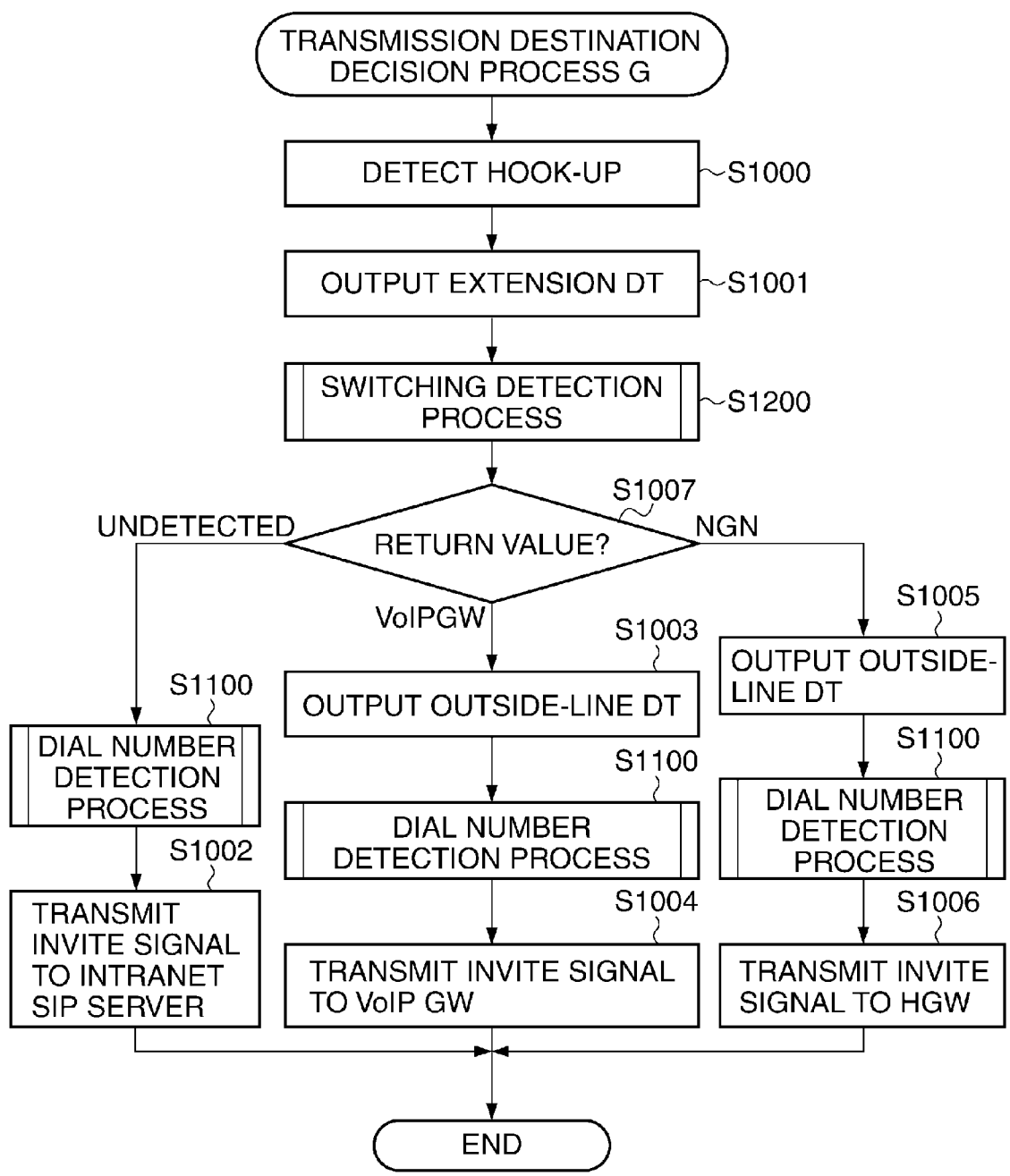
FIG. 8 is a flowchart showing the procedure of a transmission destination decision process G executed by the CPU in FIG. 2.

FIG. 8 is a flowchart showing the procedure of the transmission destination decision process G executed by the CPU 108 in FIG. 2.

The transmission destination decision process G corresponding to the case G will be described. In FIG. 8, the SLIC 117 detects that the portable handset 118 has been hooked up (step S1000), and then outputs an extension DT to the portable handset 118 (step S1001).

Then, the SLIC 117 performs the switching detection process for detecting outside line switching (step S1200), followed by the process proceeding to step S1007.

When the return value is "undetected" in step S1007 ("undetected" to step S1007), the SLIC 117 performs the dial number detection process of FIG. 9, described later (step S1100), and then transmits, to the intranet SIP server 120, an INVITE signal including the dial number stored in the RAM 111 (step S1002), followed by the process terminating.

When the return value is "VoIP GW" in step S1007 ("VoIP GW" to step S1007), the SLIC 117 outputs an outside-line DT to the portable handset 118 (step S1003) and performs the dial number detection process of FIG. 9, described later (step S1100), and then transmits, to the VoIP GW 127, an INVITE signal including the dial number stored in the RAM 111 (step S1004), followed by the process terminating.

When the return value is "NGN" in step S1007 ("NGN" to step S1007), the SLIC 117 outputs an outside-line DT to the portable handset 118 (step S1005) and performs the dial number detection process of FIG. 9, described later (step S1100), and then transmits, to the HGW 122, an INVITE signal including the dial number stored in the RAM 111 (step S1006), followed by the process terminating.

The above-described steps S401, S501, S601, S701, S801, S901 and S1001 in the respective transmission destination decision processes in FIGS. 4A to 8, correspond to a dial tone output unit which outputs, when off-hook of the portable handset 118 is detected, a dial tone to the portable handset 118 in accordance with the pseudo dial tone table 200.

Figure 9:
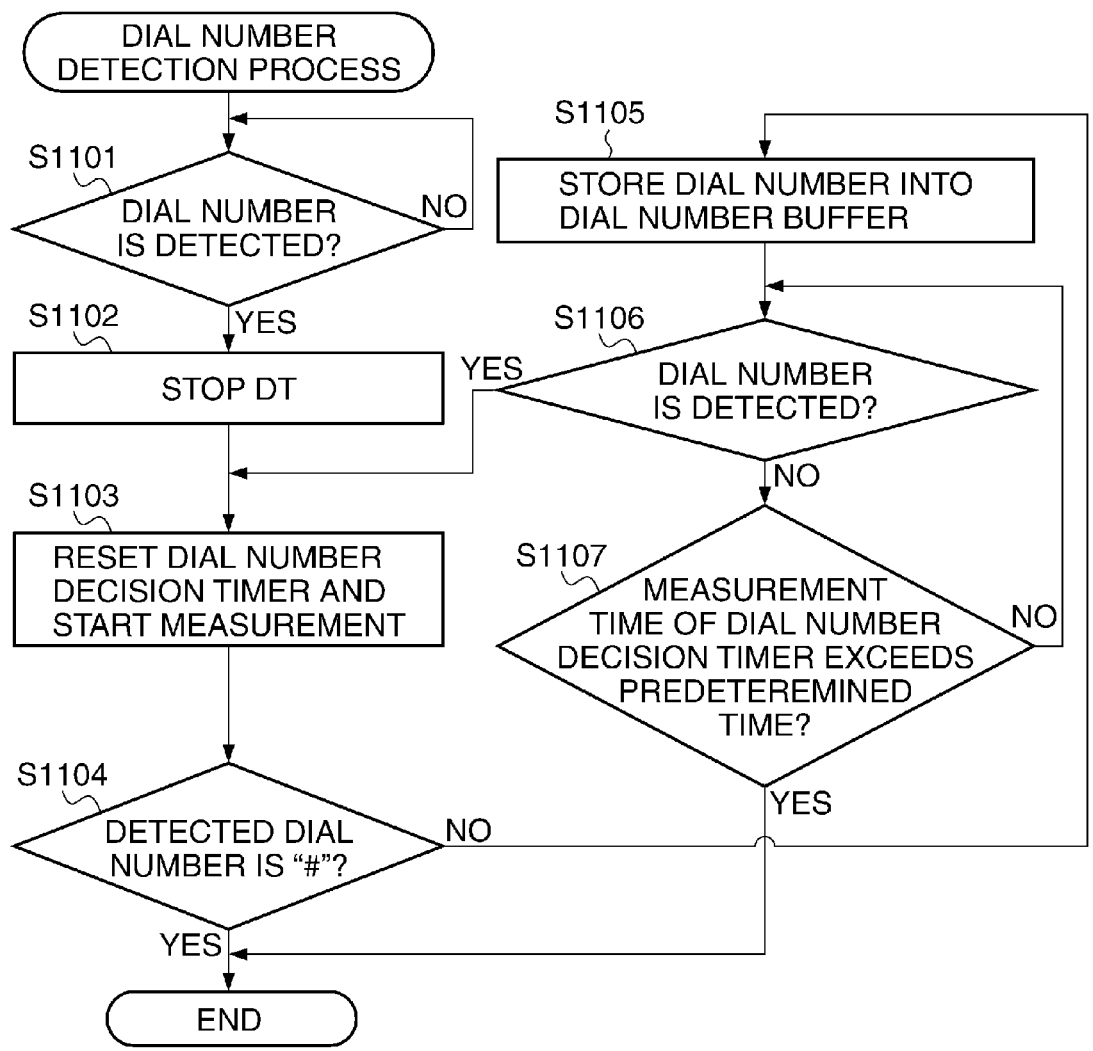
FIG. 9 is a flowchart showing the procedure of a dial number detection process of each of the transmission destination decision processes in FIGS. 4A to 8.

FIG. 9 is a flowchart showing the procedure of the dial number detection process of each of the transmission destination decision processes in FIGS. 4A to 8.

In the present embodiment, it is assumed that a dial number has been decided when a predetermined time elapses after the dial number is input or when a particular symbol is input as a dial number, similarly to a general telephone. In the present embodiment, "#" is used as the particular symbol described above. It should be noted that pulse dialing is not accepted in the present embodiment.

In FIG. 9, first, when the SLIC 117 detects a dial number input on the portable handset 118 (YES to step S1101), the SLIC 117 stops outputting the DT to the portable handset 118 (step S1102).

Next, the SLIC 117 resets a dial number decision timer for measuring, in order to decide the dial number, a predetermined time after a dial number is input, and starts measurement of the time again (step S1103). Then, the SLIC 117 determines whether the dial number detected in step S1110 is "#" or not (step S1104).

As a result of the determination of step S1104, when the detected dial number is "#" (YES to step S1104), the process is terminated.

On the other hand, as a result of the determination of step S1104, when the detected dial number is not "#" (NO to step S1104), the SLIC 117 stores the detected dial number into a dial number buffer of the RAM 111 (step S1105). The dial number buffer sequentially stores the detected dial numbers thereinto; accordingly, character strings including the dial numbers which are arranged in order of being detected are stored in the dial number buffer.

The SLIC 117 determines whether or not a dial number has been detected again (step S1106). As a result of the determination of step S1106, when a dial number has been detected (YES to step S1106), the process proceeds to step S1103 described above.

On the other hand, as a result of the determination of step S1106, when a dial number has not been detected (NO to step S1106), the SLIC 117 determines whether or not the measurement time of the dial number decision timer has exceeded the predetermined time (step S1107).

As a result of the determination of step S1107, when the measurement time of the dial number decision timer has not exceeded the predetermined time (NO to step S1107), the process returns to step S1106. On the other hand, as a result of the determination of step S1107, when the measurement time of the dial number decision timer has exceeded the predetermined time (YES to step S1107), the process is terminated.

Figure 10:
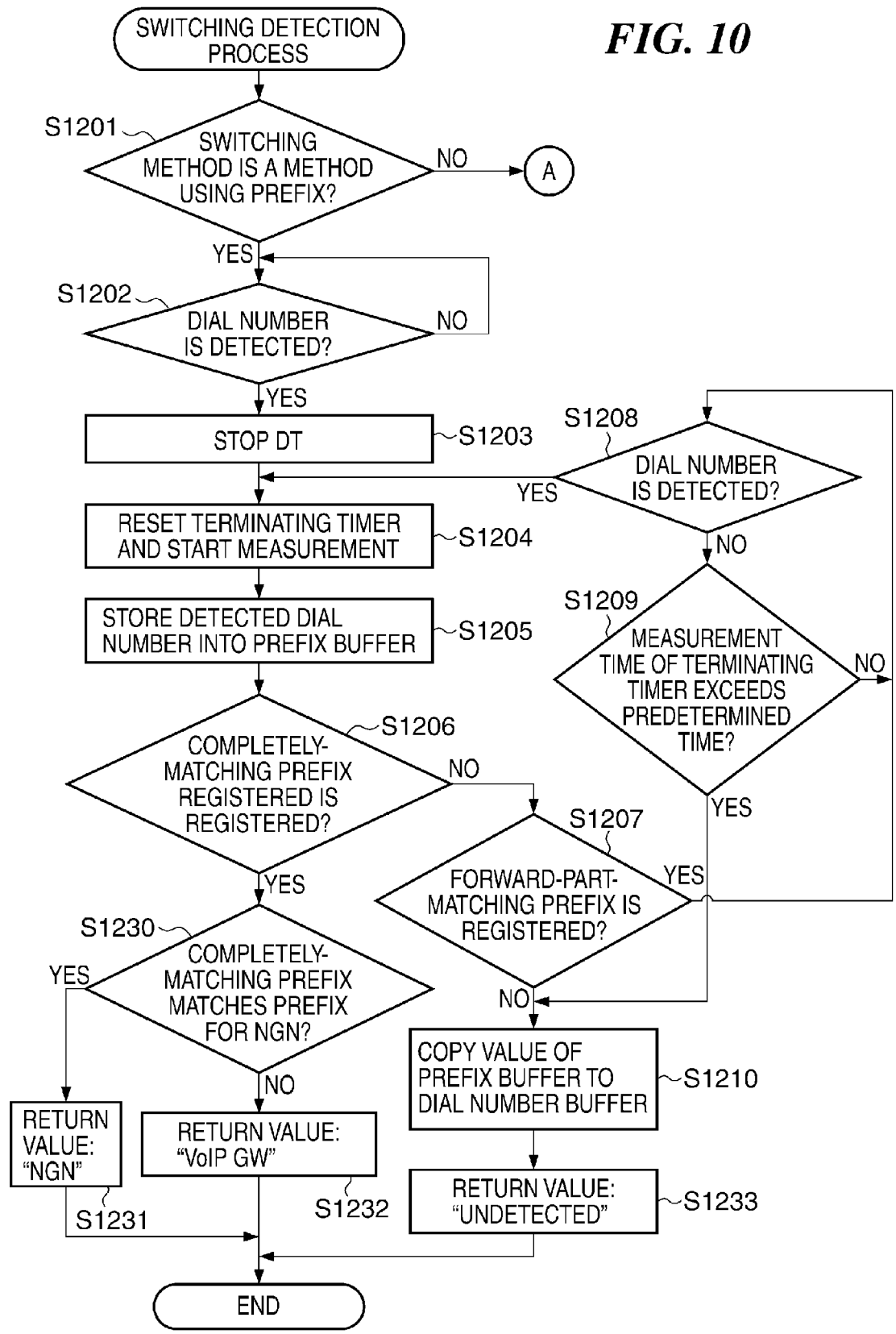
FIG. 10 is a flowchart showing the procedure of a switching detection process of each of the transmission destination decision processes in FIGS. 5 to 8.
Figure 11:
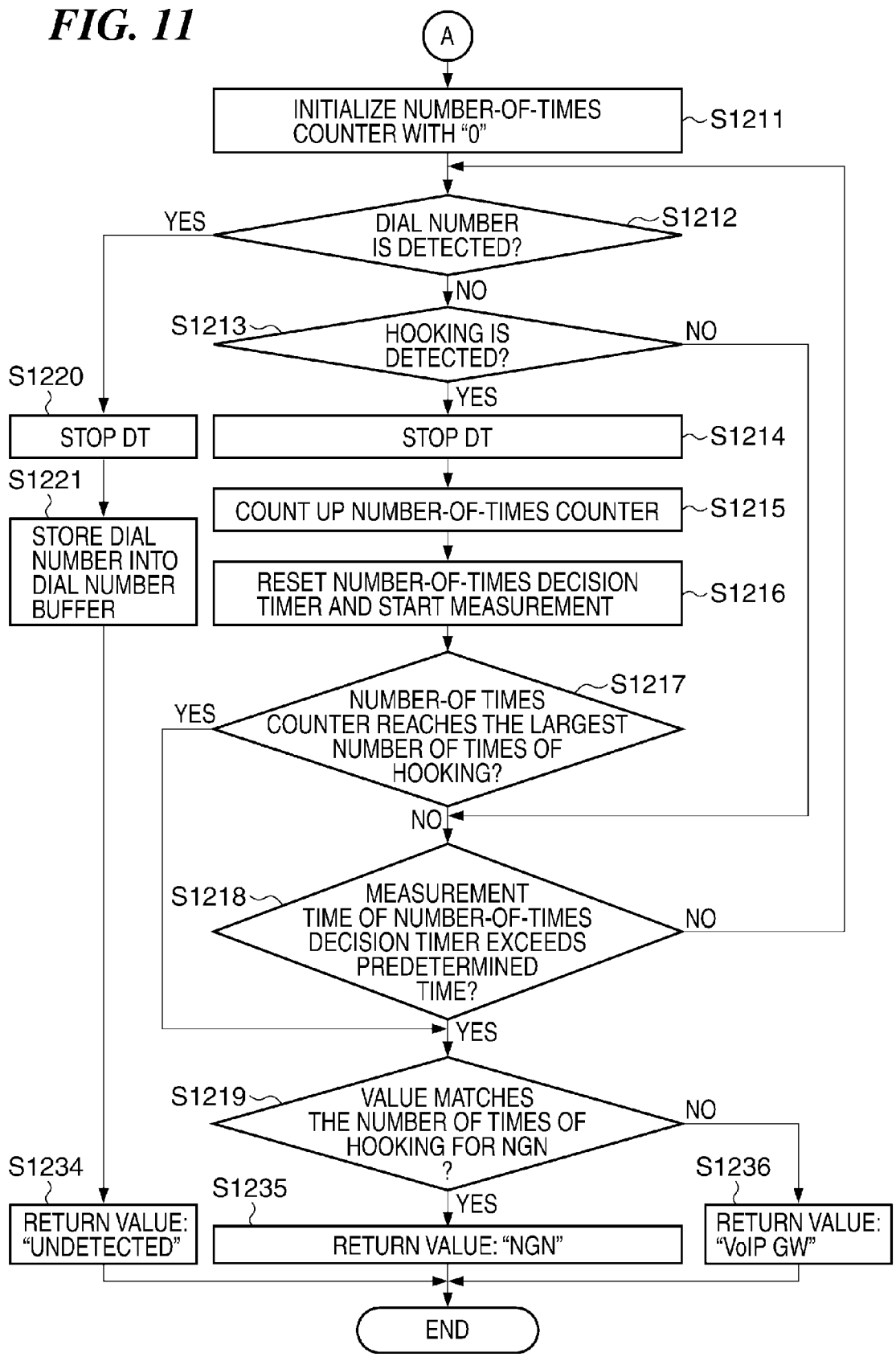
FIG. 11 is a flowchart showing the procedure of the switching detection process of each of the transmission destination decision processes in FIGS. 5 to 8.

FIGS. 10 and 11 are flowcharts showing the procedure for the switching detection process of each of the transmission destination decision processes shown in FIGS. 5 to 8.

In FIG. 10, first, the SLIC 117 determines whether or not the switching method shown in the outside line switching setting registration table 300 stored in the RAM 111, is the method using a prefix (step S1201).

As a result of the determination of step S1201, when the switching method is the method using the prefix (YES to step S1201), and furthermore, the SLIC 117 detects a dial number input on the portable handset 118 (YES to step S1202), the SLIC 117 stops outputting the DT to the portable handset 118 (step S1203).

Next, the SLIC 117 resets a terminating timer for measuring, in order to end detection, a predetermined time from when a dial number is input, and starts measurement of the time again (step S1103).

The SLIC 117 stores the detected dial number into a prefix buffer of the RAM 111 (step S1205). The prefix buffer sequentially stores the detected dial numbers thereinto; accordingly, character strings including the dial numbers which are arranged in order of detection are stored in the prefix buffer.

Next, the SLIC 117 determines whether or not there is a prefix, among the prefixes registered in the outside line switching setting registration table 300, which completely matches a character string including dial numbers stored in the prefix buffer (hereinafter referred to as "completely-matching prefix") (step S1206).

As a result of the determination of step S1206, when there is the completely-matching prefix in the outside line switching setting registration table 300 (YES to step S1206), the SLIC 117 determines whether or not the character string showing the character string including dial numbers stored in the prefix buffer matches the prefix of NGN registered in the outside line switching setting registration table 300 (step S1230).

As a result of the determination of step S1230, when the stored character string matches the registered prefix of NGN (YES to step S1230), the SLIC 117 sets the return value to "NGN" (step S1231), followed by the process terminating.

On the other hand, as a result of the determination of step S1230, when the stored character string does not match the registered prefix of NGN (NO to step S1230), the SLIC 117 sets the return value to "VoIP GW" (step S1232), followed by the process terminating.

As a result of the determination of step S1206, when there is not the completely-matching prefix in the outside line switching setting registration table 300 (NO to step S1206), the SLIC 117 determines whether or not there is a prefix, among the prefixes registered in the outside line switching setting registration table 300, of which the forward part matches the character string including dial numbers stored in the prefix buffer (hereinafter referred to as "forward-part-matching prefix") (step S1207).

In step S1207, in other words, it is determined whether or not the prefix is partway input by the user. Focusing on a prefix "25" registered in the outside line switching setting registration table 300, when the detected and stored character string is "2", it is determined that the character string "2" and the prefix "25" matches each other, that is, it is determined that there is the forward-part-matching prefix in the outside line switching setting registration table 300.

As a result of the determination of step S1207, when there is not the forward-part-matching prefix in the outside line switching setting registration table 300 (NO to step S1207), it is determined that a prefix is not being input; accordingly, it is regarded as that a dial number other than a prefix is being input.

Therefore, the SLIC 117 copies the value of the prefix buffer to the dial number buffer (step S1210) and sets the return value to "undetected" (step S1233), followed by the process terminating.

On the other hand, as a result of the determination of step S1207, when there is the registered forward-part-matching prefix in the outside line switching setting registration table 300 (YES to step S1207), the SLIC 117 determines whether or not a dial number has been detected (step S1208). Steps S1208 and S1202 respectively correspond to a detection unit which detects, when a dial tone is output to the portable handset 118, input contents on the portable handset 118.

As a result of the determination of step S1208, when a dial number has been detected (YES to step S1208), the process proceeds to step S1204 described above.

On the other hand, as a result of the determination of step S1208, when a dial number has not been detected (NO to step S1208), the SLIC 117 determines whether or not the measurement time of the terminating timer has exceeded the predetermined time (step S1209).

As a result of the determination of step S1209, when the measurement time of the terminating timer has not exceeded the predetermined time (NO to step S1209), the process returns to step S1208. On the other hand, as a result of the determination of step S1209, when the measurement time of the terminating timer has exceeded the predetermined time (YES to step S1209), the process proceeds to step S1210 described above.

As a result of the determination of step S1201, when the switching method is not the method using the prefix (NO to step S1201), the switching method is regarded as a method using hooking.

Proceeding to FIG. 11, a number-of-times counter for counting the number of times of detecting of hooking is initialized with "0" (step S1211), and then it is determined whether or not a dial number has been detected (step S1212). As a result of the determination of step S1212, when the dial number has been detected (YES to step S1212), the SLIC 117 stops outputting a DT to the portable handset 118 (step S1202).

Next, the SLIC 117 stores the detected dial number into the dial number buffer of the RAM 111 (step S1221) and sets the return value to "undetected" (step S1233), followed by the process terminating.

As a result of the determination of step S1212, when dial number has not been detected (NO to step S1212), the SLIC 117 determines whether or not hooking has been detected (step S1213).

As a result of the determination of step S1213, when hooking has not been detected (NO to step S1213), the process proceeds to step S1218.

On the other hand, as a result of the determination of step S1213, when hooking has been detected (YES to step S1213), the SLIC 117 stops outputting a DT to the portable handset 118 (step S1214).

Then, the SLIC 117 makes the number-of-times counter to count up (step S1215), resets a number-of-times decision timer for measuring, in order to decide the number of times of the detection of the hooking, a predetermined time from when a dial number is input, and starts measurement (step S1216). Next, the SLIC 117 determines whether or not the value of the number-of-times counter has reached the largest number of times of hooking (step S1217).

The largest number of times of hooking means the largest number of times among the number of times of hooking registered in the outside line switching setting registration table 300. In the case of the outside line switching setting registration table 300, the largest number of times of hooking is two.

As a result of the determination of step S1217, when the value has not reached the largest number of times of hooking (NO to step S1217), the SLIC 117 determines whether or not the measurement time of the number-of-times decision timer has exceeded the predetermined time (step S1218).

As a result of the determination of step S1218, when the measurement time of the number-of-times decision timer has not exceeded the predetermined time (NO to step S1218), the process proceeds to step S1212 described above.

On the other hand, as a result of the determination of step S1218, when the measurement time of the number-of-times decision timer has exceeded the predetermined time (YES to step S1218), the SLIC 117 determines whether or not the value of the number-of-times counter matches the number of times of hooking for NGN registered in the outside line switching setting registration table 300 (step S1219).

As a result of the determination of step S1219, when the value of the number-of-times counter matches the registered number of times of hooking for NGN (YES to step S1219), the SLIC 117 sets the return value to "NGN" (step S1235), followed by the process terminating.

On the other hand, as a result of the determination of step S1219, when the value of the number-of-times counter does not match the registered number of times of hooking for NGN (NO to step S1219), the SLIC 117 sets the return value to "VoIP GW" (step S1236), followed by the process terminating.

Steps S1231, S1232, S1233, S1234, S1235 and S1236 described above correspond to an identification unit which identifies a network for communication which includes a communication destination based on the detected input contents, in accordance with the outside line switching setting registration table 300.

In steps S1231, S1232, and S1233, a network which is associated with the detected dial number in the outside line switching setting registration table 300, is identified as the network for communication which includes the communication destination. In steps S1234, S1235, and S1236, a network which is associated with the detected number of times of off-hook in the outside line switching setting registration table 300, is identified as the network for communication which includes the communication destination.

As described above, according to the present embodiment, when off-hook of the telephone is detected, the SLIC 117 outputs a dial tone to the telephone according to the pseudo dial tone table 200 (step S701). When the dial tone is output to the telephone, input contents input on the telephone is detected (steps S1208 and S1202), and a network for communication which includes the communication destination is identified based on the detected input contents in accordance with the outside line switching setting registration table 300 (step S1231 etc.). Therefore, the user can easily specify a network for communication.

Further, in a case where, when the telephone is hooked off by the user, a dial tone for outside line is made, the user can recognize that there is no need to specify a network for communication. Furthermore, in a case where, when the telephone is hooked off by the user, a dial tone for extension is made, the user can recognize that there is a need to specify a network for communication. As described above, the communication apparatus according to the present embodiment has high usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068643, filed Mar. 28, 2014 which is hereby incorporated by reference herein in its entirety.

What is claimed is:

1. A communication apparatus, to which a telephone is configured to be hooked up, configured to communicate with a plurality of networks, comprising:
   a dial tone output unit configured to output, when the telephone is hooked up, a dial tone to the telephone in accordance with dial tone setting information, the dial tone being set based on whether or not a connection to one or more of the plurality of networks is available;
   a detection unit configured to detect, when the dial tone is output to the telephone by the dial tone output unit, content input by the telephone;
   a storage unit configured to store registration information used for identifying each network of the plurality of networks; and
   an identification unit configured to identify a particular network for communication and an associated communication destination based on the detected content, in accordance with the registration information,
   wherein the content detected by the detection unit is a particular dial number,
   wherein the registration information includes different dial numbers associated with each network of the plurality of networks, and
   wherein the identification unit is configured to identify, as the particular network for communication, a network which is associated with the particular dial number in the registration information.

2. The communication apparatus according to claim 1, wherein the plurality of networks include an intranet, an NGN, or a PSTN.

3. The communication apparatus according to claim 1, wherein the dial tone setting information includes a first predetermined dial tone which is emitted in a case where the particular network for communication is uniquely determined and the particular network for communication is not the intranet, and a second predetermined dial tone, different from the first predetermined dial tone, which is emitted in a case where the particular network for communication is not uniquely determined or in a case where the particular network for communication is the intranet.

4. A communication apparatus, to which a telephone is configured to be hooked up, configured to communicate with a plurality of networks, comprising:

a dial tone output unit configured to output, when the telephone is hooked up, a dial tone to the telephone in accordance with dial tone setting information, the dial tone being set based on whether or not a connection to one or more of the plurality of networks is available;

a detection unit configured to detect, when the dial tone is output to the telephone by the dial tone output unit, content input by the telephone;

a storage unit configured to store registration information used for identifying each network of the plurality of networks; and an identification unit configured to identify a particular network for communication and an associated communication destination based on the detected content, in accordance with the registration information, wherein the content detected by the detection unit is a particular number of times of hooking, wherein the registration information includes different numbers of times of hooking associated with each network of the plurality of networks, and wherein the identification unit is configured to identify, as the particular network for communication, a network which is associated with the particular number of times of hooking in the registration information.

5. A communication apparatus, provided with a telephone, configured to communicate with a plurality of networks, comprising:

a dial tone output unit configured to output a dial tone to the telephone in accordance with dial tone setting information, the dial tone being set based on whether or not a connection to one or more of the plurality of networks is available;

a detection unit configured to detect, when the dial tone is output to the telephone by the dial tone output unit, content input by the telephone;

a storage unit configured to store registration information used for identifying each network of the plurality of networks; and an identification unit configured to identify a particular network for communication and an associated communication destination based on the detected content, in accordance with the registration information, wherein the content detected by the detection unit is a particular dial number, wherein the registration information includes different dial numbers associated with each network of the plurality of networks, and wherein the identification unit is configured to identify, as the particular network for communication, a network which is associated with the particular dial number in the registration information.

6. A control method for a communication apparatus, to which a telephone is configured to be hooked up, configured to communicate with a plurality of networks, the control method comprising:

a dial tone output step of outputting, when the telephone is hooked up, a dial tone to the telephone in accordance with dial tone setting information, the dial tone being set based on whether or not a connection to one or more of the plurality of networks is available;

a detection step of detecting, when the dial tone is output to the telephone at the dial tone output step, content input by the telephone;

a storage step of storing registration information used for identifying each network of the plurality of networks; and an identification step of identifying a particular network for communication and an associated communication destination based on the detected content, in accordance with the registration information, wherein the content detected by the detection unit is a particular dial number, wherein the registration information includes different dial numbers associated with each network of the plurality of networks, and wherein the identification unit is configured to identify, as the particular network for communication, a network which is associated with the particular dial number in the registration information.

7. A control method for a communication apparatus, provided with a telephone, configured to communicate with a plurality of networks, the control method comprising:

a dial tone output step of outputting a dial tone to the telephone in accordance with dial tone setting information, the dial tone being set based on whether or not a connection to one or more of the plurality of networks is available;

a detection step of detecting, when the dial tone is output to the telephone at the dial tone output step, content input by the telephone;

a storage step of storing registration information used for identifying each network of the plurality of networks; and an identification step of identifying a particular network for communication and an associated communication destination based on the detected content, in accordance with the registration information, wherein the content detected by the detection unit is a particular dial number, wherein the registration information includes different dial numbers associated with each network of the plurality of networks, and wherein the identification unit is configured to identify, as the particular network for communication, a network which is associated with the particular dial number in the registration information.

8. A communication apparatus, provided with a telephone, configured to communicate with a plurality of networks, comprising:

a dial tone output unit configured to output a dial tone to the telephone in accordance with dial tone setting information, the dial tone being set based on whether or not a connection to one or more of the plurality of networks is available;

a detection unit configured to detect, when the dial tone is output to the telephone by the dial tone output unit, content input by the telephone;

a storage unit configured to store registration information used for identifying each network of the plurality of networks; and an identification unit configured to identify a particular network for communication and an associated communication destination based on the detected content, in accordance with the registration information, wherein the content detected by the detection unit is a particular number of times of hooking, wherein the registration information includes different numbers of times of hooking associated with each network of the plurality of networks, and wherein the identification unit is configured to identify, as the particular network for communication, a network which is associated with the particular number of times of hooking in the registration information.

9. A control method for a communication apparatus, to which a telephone is configured to be hooked up, configured to communicate with a plurality of networks, the control method comprising:
- a dial tone output step of outputting, when the telephone is hooked up, a dial tone to the telephone in accordance with dial tone setting information, the dial tone being set based on whether or not a connection to one or more of the plurality of networks is available;
- a detection step of detecting, when the dial tone is output to the telephone at the dial tone output step, content input by the telephone;
- a storage step of storing registration information used for identifying each network of the plurality of networks; and
- an identification step of identifying a particular network for communication and an associated communication destination based on the detected content, in accordance with the registration information,
- wherein the content detected by the detection unit is a particular number of times of hooking,
- wherein the registration information includes different numbers of times of hooking associated with each network of the plurality of networks, and
- wherein the identification unit is configured to identify, as the particular network for communication, a network which is associated with the particular number of times of hooking in the registration information.

10. A control method for a communication apparatus, provided with a telephone, configured to communicate with a plurality of networks, the control method comprising:
- a dial tone output step of outputting a dial tone to the telephone in accordance with dial tone setting information, the dial tone being set based on whether or not a connection to one or more of the plurality of networks is available;
- a detection step of detecting, when the dial tone is output to the telephone at the dial tone output step, content input by the telephone;
- a storage step of storing registration information used for identifying each network of the plurality of networks; and
- an identification step of identifying a particular network for communication and an associated communication destination based on the detected content, in accordance with the registration information,
- wherein the content detected by the detection unit is a particular number of times of hooking,
- wherein the registration information includes different numbers of times of hooking associated with each network of the plurality of networks, and
- wherein the identification unit is configured to identify, as the particular network for communication, a network which is associated with the particular number of times of hooking in the registration information.

* * * * *